United States Patent [19]

Lane

[11] 4,136,669
[45] Jan. 30, 1979

[54] SOLAR HEAT COLLECTING MODULE AND MODULAR SYSTEM

[76] Inventor: George T. Lane, P.O. Box 306, Fleming, Colo. 80728

[21] Appl. No.: 797,351

[22] Filed: May 16, 1977

[51] Int. Cl.² .............................................. F24J 3/02
[52] U.S. Cl. .................................... 126/270; 237/1 A
[58] Field of Search ................ 126/270, 271; 237/1 A

[56] References Cited

U.S. PATENT DOCUMENTS

| | | | |
|---|---|---|---|
| 2,311,579 | 2/1943 | Scott | 126/271 |
| 3,949,732 | 4/1976 | Reines | 126/271 |
| 3,994,276 | 11/1976 | Pulver | 126/270 |
| 4,007,728 | 2/1977 | Guba | 126/270 |
| 4,010,733 | 3/1977 | Moore | 126/271 |
| 4,019,494 | 4/1977 | Safdari | 126/270 |
| 4,033,324 | 7/1977 | Eckels | 126/271 |
| 4,062,346 | 12/1977 | Rapp, Jr. et al. | 237/1 |

*Primary Examiner*—Kenneth W. Sprague
*Attorney, Agent, or Firm*—Ancel W. Lewis, Jr.

[57] ABSTRACT

A versatile, low cost solar heat collecting module made up of a minimum of presized basic parts has a cover portion for passing solar energy into an inner cavity where it is absorbed by a collector plate and converted to heat which in turn heats a stream of air in a flow passage along the back face of the collector plate. Manifold portions at the ends facilitate the moving of a stream of air through each module and an array of interconnected modules are arranged side-by-side in such a way that the flow path for air from inlet to outlet for the array is substantially the same distance. A heat-washing means projects into the flow passage from the back side of the collector plate to cause a turbulence in the air stream, the heat-washing means being provided by a support strap for supporting the collector plate that is bent to project into the flow passage and place a tension in the support strap and collector plate.

5 Claims, 12 Drawing Figures

SOLAR HEAT COLLECTING MODULE AND MODULAR SYSTEM

FIELD OF THE INVENTION

This invention relates to a novel and improved solar heat collecting module and modular system that is particularly suited for hot air heating.

BACKGROUND OF THE INVENTION

Solar energy for heating purposes is now recognized as a viable and possibly necessary alternative to combustion fuels. Of particular importance in utilizing solar energy for this purpose is the cost of component parts, manufacture and installation, the adaptability of the structure and system to existing heating systems and building structures, and the heating capacity of the collecting modules and an array thereof for meeting specific heat requirements.

Accordingly, it is an object of the present invention to provide a novel and improved simple, versatile, strong, durable and relatively low cost, solar heat collecting module.

Another object of this invention is to provide a novel and improved solar energy collecting module constructed and arranged with a high degree of versatility in length and width dimensions to meet specific heating requirements.

Still another object of the present invention is to provide a novel and improved solar heat collecting module of a construction that can be fabricated into a variety of lengths and widths using a minimum of basic parts, the parts being easily sized, readily available, relatively inexpensive materials, and readily and easily assembled.

A further object of the present invention is to provide a novel solar heat collecting module in the form of a relatively lightweight flat panel that is readily connected side-by-side with another similar module to form an array of interconnected modules that are readily joined for a selected heating capacity.

Yet a further object of the present invention is to provide a novel array of solar heat collecting modules in which the airflow from inlet to outlet is substantially the same distance throughout the array for uniform heating.

SUMMARY OF THE INVENTION

In accordance with the present invention there is provided a solar heat collecting module which has a cover portion, a collector plate, and a heat-insulating back portion providing a structural part, each preferably in unitary sheet form, that are sized in length and width to meet specific heat-producing requirements and are supported and held in place by rigid side rails of a special configuration and selected length. The side rails are of a uniform configuration for a range of sheet area dimensions. The module is a substantially self-supporting, presized, panel-like, integral structure which requires a minimum of basic parts to provide a unit of a desired length and width without retooling. The collector plate shown is a sheet metal panel with a blackened absorbing surface and is disposed and held in a fixed spaced and parallel relation to the cover sheet and back sheet and supported in place by the side rails to form a closed air space between the absorbing surface and collector plate. A flow passage is formed along a back face of the collector plate and the back sheet between the side rails. The collector plate absorbs solar radiation falling on the absorbing surface to heat the collector plate which in turn heats a stream of air moved in the flow passage. Manifold portions at each end facilitate the moving of a stream of air to and from the flow passage through each module and between adjacent similar modules in an interconnected array of the modules arranged side-by-side, and the manifold portions are arranged to that the air from the inlet to the outlet of the array travels approximately the same distance. A heat-washing means extends into the flow passage from the back face of the collector plate causing a turbulence in the stream of air, the heat-washing means being provided by at least one strap fastened at the ends to the side rails which also holds the collector plate away from the back sheet, and the support strap is bent to form a heat-washing section while at the same time placing a tension in the support strap and collector plate.

Other objects, advantages and capabilities of the present invention will become more apparent as the description proceeds taken in conjunction with the accompanying drawings, in which that parts have similar reference numerals and in which.

Figure 1:
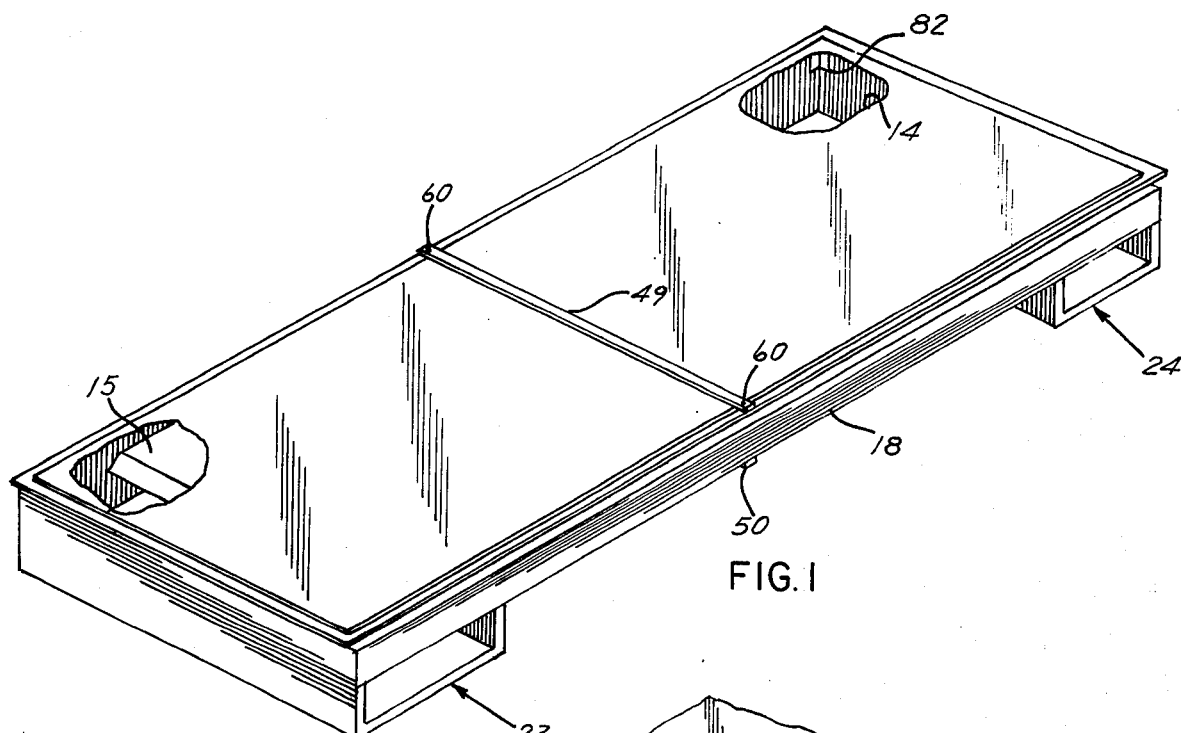
FIG. 1 is a top perspective view of a solar heat collecting module embodying features of the present invention.

The solar heat collecting module shown is in the form of a flat-sided, panel-like body or member of a selected length and width, but is usually of a dimension that is readily handled and moved into place by one or two persons. The construction of the module shown is that of a readily assembled, multi-layered structure which includes a cover portion or sheet 14 and a back portion or sheet 15 defining the major faces thereof and supported and held in parallel planes in a spaced relation to one another by a pair of opposed side rails 17 and 18. A collector plate 19 made of sheet metal with a darkened absorbing surface 19a is disposed and held between and in a parallel and spaced relation to the cover sheet 14 and back sheet 15 by the side rails to form a closed or dead air space 21 between sheet 14 and the collector plate 19 and a flow passage 22 between the back face of the collector plate and the front face of the back sheet 15. The module shown further includes a pair of end manifold portions 23 and 24 mounted on the back at the ends of the back sheet 15 arranged in airflow communication with the flow passage 22 as well as a pair of end rails 25 and 26 mounted at the opposite ends of the module.

The cover sheet 14 shown is smooth-surfaced, flat, relatively lightweight, durable, and is of a construction that is highly transmissive of solar energy in one direction toward the collector plate 19 and inhibits the passing of infrared energy in the opposite direction away from the collector plate 19. A sheet 14 is imperforate so as to minimize the heat loss therethrough by conduction. A suitable product for this purpose is a fiberglass sheet made and sold under the name "Kal-Wall". A preferred thickness for sheet 14 is about 0.040 inches.

The back sheet 15 preferably is a duct board having good heat insulation qualities and also having sufficient structural strength to serve as a structural part to add structural strength to the assembly. The duct board shown has an inner insulation portion 15a and an outer aluminum facing portion 15b.

Figure 5:
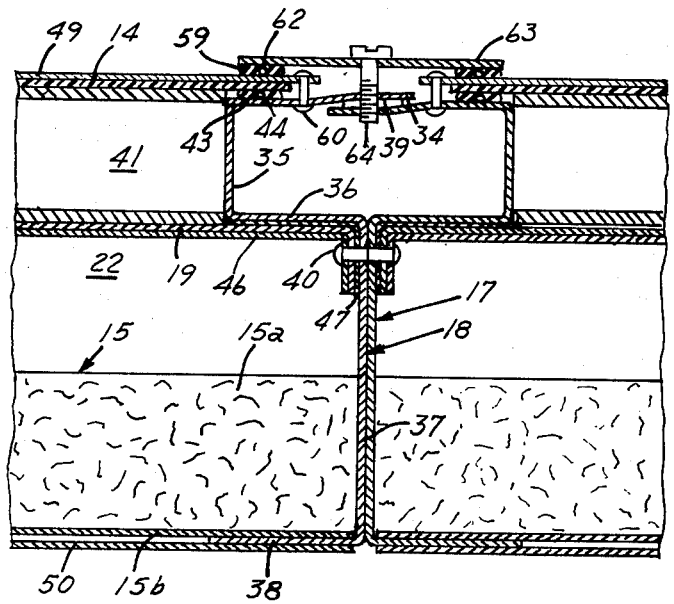
FIG. 5 is a sectional view taken along lines 5—5 of FIG. 4 showing the connection between the side edges of two adjacent modules.
Figure 6:
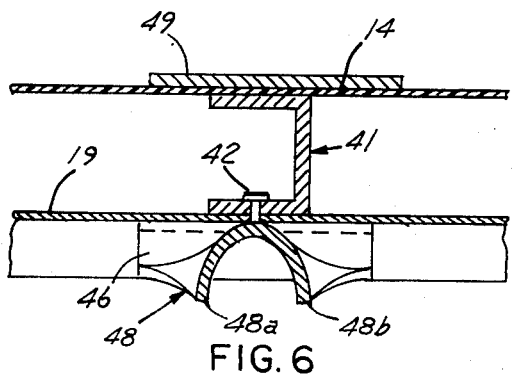
FIG. 6 is a sectional view taken along lines 6—6 of FIG. 4.
Figure 7:
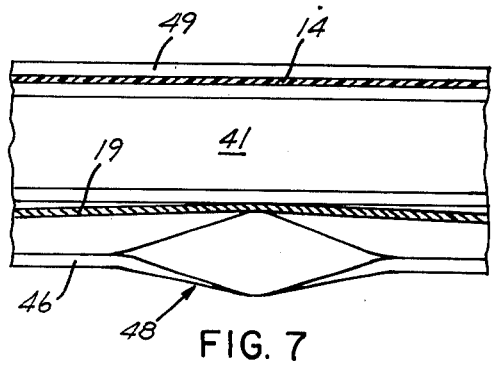
FIG. 7 is an end elevation view of a central fragment of the module showing the bent projecting section of the support strap viewed at right angles to the portion shown in FIG. 6.

Each of the side rails is of a similar construction with one forming one side and the other forming the other side of the module. Referring now to FIG. 5 and with specific reference to side rail 18, this side rail is shown to have a generally S-shaped cross section which includes a front flange section 34, an inner sidewall web section 35, an intermediate flange section 36, an outer sidewall web section 37, and a back flange section 38.

The front flange section 34 extends laterally out beyond the outer sidewall web section 37 so as to be positioned in an overlapping relation to the front flange section of the side rail of the next adjacent module together with the respective outer sidewall web sections 37 butted against one another as shown in FIG. 5. With this arrangement of the manifold portions they project in a direction away from the back face of the back sheet and provide an airflow path along the ends of the airflow passage of that module.

The side rails are rigid to provide structural strength and preferably are made of a rigid metal that is also imperforate to airflow. The configuration of the side rails also serves to support and position the side edges of the cover sheet, collector plate, and back sheet in the desired fixed spaced relation. In practice the cover sheet, collector plate and back sheet are sized for a specific heat requirement and the side rails are of the same configuration for all sheet surface area dimensions.

A hollow, lightweight, rigid, metal spacer member 41 is suitably connected, preferably midway between the ends of the module, to provide for spacing between the side rails and for added strength. Specifically, the spacer member 41 has a U-shaped cross section and is affixed to the collector plate by means of suitably spaced rivets 42. The module shown in a preferred form is six feet in length. For modules longer than six feet, such as twelve feet, there would be two cross rods at suitably spaced intervals along the module between the ends thereof.

Referring now to FIG. 5, the cover sheet 14 is shown connected along its marginal side edges to the front flange section 34 of the side rails using preferably an adhesive strip of material 43 and a spacing cord 44 along the lengthwise extent thereof to provide for a substantially uniform space between the cover sheet and the collector plate. This provides a gas-tight connection between these parts which in part form the closed air space 21. The side edges of cover sheet 14 terminate substantially inside the outer extremity of flange section 34. The side edges of the collector plate 19 are turned to form a right angle flange that nests in and is affixed to the outer sidewall section 37 and is supported in part by flange section 36, there being a rivet shown for this connection. The side flanges of the back sheet 15 are affixed to the back flange section 38 as by rivets or an adhesive. A layer of heat-insulating tape 47 is disposed between the collector plate and the side rails to prevent heat loss. These connections of the parts are such as to form gas-tight seals to prevent heat loss.

A relatively narrow strap 46, preferably of sheet metal, is secured along the back face of the collector plate midway between the ends thereof and has the ends turned to fit inside the side flanges of the collector plate. The strap 46 and collector plate are affixed to the side rails as with the rivet 40. The strap 46 has a bent projecting section 48 between the fastened ends wherein the opposite edge portions are of a limited length and are bent toward one another to form a pair of projections 48a and 48b spaced from one another that project into the flow passage 22. This bending of the strap along an intermediate section also places a tension or stress in the support strap 46 and the collector plate and the result is that the collector plate is prevented from sagging while at the same time the projections also produce turbulence in the airflow and a washing effect to remove heat from the collector plate to the air stream as a stream of air is moved through the flow passage.

A top support strap 49 is fastened at the ends to the side rails midway between the ends of the side rails and a bottom support strap 50 is fastened at the ends to the side rails for added strength. These straps prevent twisting and lock the structure in place to the side rails.

Figure 2:
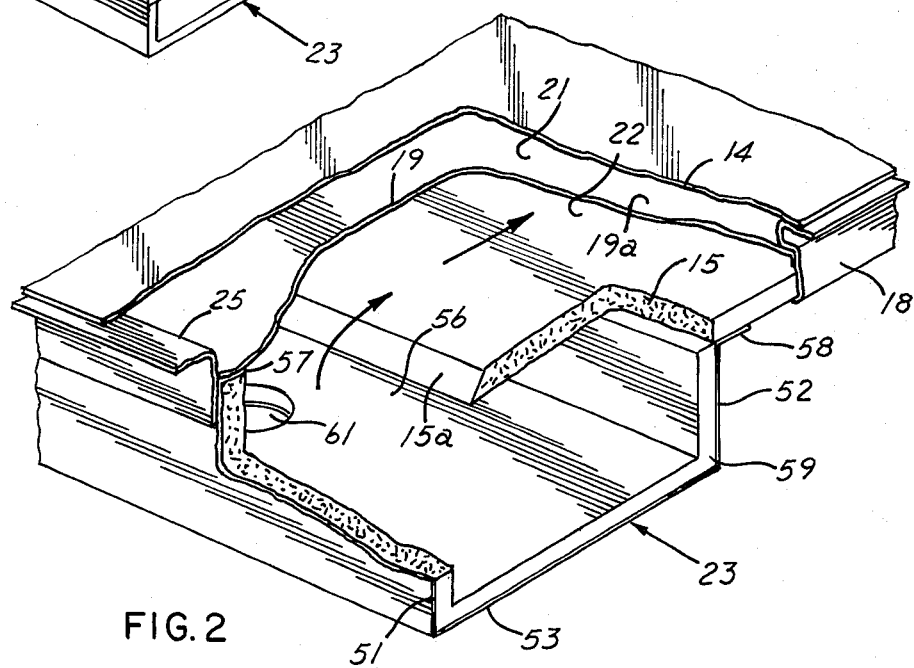
FIG. 2 is a corner fragment of the solar heat collecting module shown in FIG. 1 with portions broken away to show interior parts.
Figure 3:
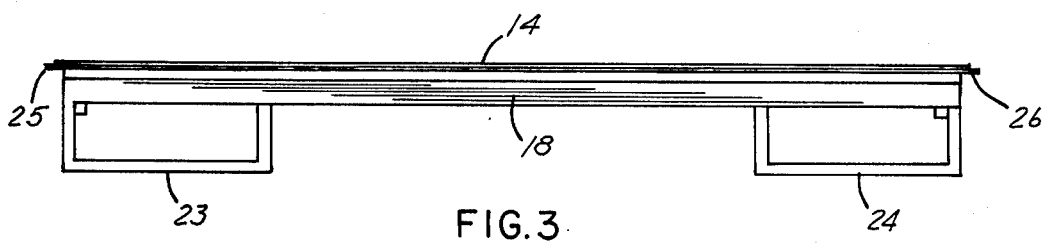
FIG. 3 is a side elevation view of the solar heat collecting module of FIG. 1.

Each of the manifold portions is of the same construction and each includes a generally hollow, channel-shaped body with opposed end walls 51 and 52, and a bottom 53, and is open at the ends and top. The end wall 51 has a top flange 57 that is turned toward the inside of the open top and is affixed to the bottom of the collector plate as with rivets or an adhesive to form a gas-tight connection. End wall 52 has a top flange 58 that is turned away from the inside of the open top and is affixed to the bottom of the back sheet 15 as with rivets or an adhesive to form a gas-tight connection. As best seen in FIG. 2, the back sheet 15 terminates short of the end wall of the manifold at each end to form a flow path 56 with the flow passage 22. The edges of the back sheet 15 are beveled as shown at 15a to provide a relatively smooth air stream. The inside of the channel-shaped manifold body is heat-insulated with a layer of heat insulation designated by numeral 59 to reduce heat losses through the manifold walls.

A flow opening 61 is shown in a bottom central location of the manifold which may serve as an inlet or outlet for the air when the module is disposed as an end module in a cell, as described more fully hereinafter with reference to FIG. 10.

In assembling the above-described module the collector plate 19 is placed with the absorbing surface down with the side flanges supported on a supporting jig. A strip of heat-insulating tape 47 is placed along the side edges to avoid metal-to-metal contact. The side rails 17 and 18 are then positioned and secured to the collector plates as with blind rivets 40 disposed at spaced intervals along the side rails.

The partially completed structure is then inverted and the spacing member is positioned and secured to the collector plate as with blind rivets 42 at spaced intervals laterally of the collector plate. Again a strip of heat-insulating tape may be placed between the collector plate and spacer bar for further heat insulation between metal parts.

An adhesive is placed along the side edges of the back sheet 15 across the back face and it is dropped into place on the side rail back flange section 38 so as to form an essentially gas-tight connection between side edges of the back sheet and side rails. The back supporting strap 50 is fastened at its ends to the side rail back flange section 38. The manifold bodies 23 and 24 are set in place and the flanges thereof are suitably fastened to the side rails as with rivets or like fasteners.

The partially completed module is then turned over face up. The manifold bodies are then further fastened at the inturned flanges as required. The end rails 25 and 26 are positioned and, by means of an inside bracket 82 and blind rivets, the side rail, end rail, and manifold body are secured together at the corners of the manifold body. The end rails are shown to close off the ends of the closed air space 21.

An adhesive insulating tape like that of 43 and 44 above described is applied to the side rails and end rails just at the inside opening and the cover sheet 14 is positioned and pressed down against the adhesive. Finally, the supporting strap 49 is fastened at its ends to the side rails as with rivets 60.

Figure 4:
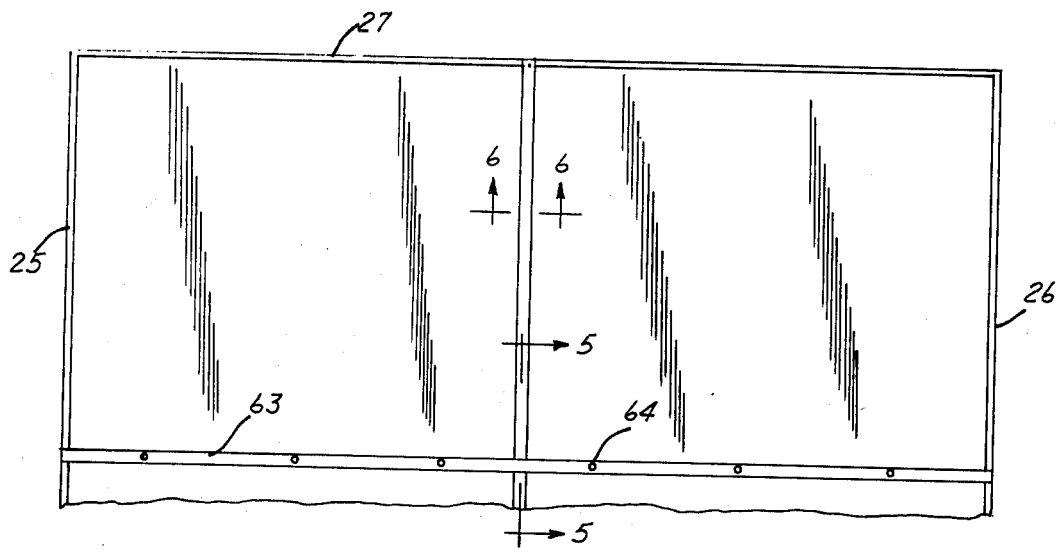
FIG. 4 is a top plan view of the solar heat collecting module of FIG. 1 with a portion of another similar module shown connected side-by-side.

An assembly of two modules side-by-side illustrated in FIGS. 4 and 5 has the outer sidewall web portions 37 butting against one another and the front flange sections 34 overlapping one another. A strip of adhesive material 59 is disposed along the side edges of the adjacent cover sheet with a spacing cord 62 and a metal strip 63 spans and overlaps the two and the strip 63 is secured in place by a fastening screw 64 that threads down through the strip 63 and into the overlapping flanges. A heat-insulating material 39 is provided between the overlapping front flange sections.

Figure 8:
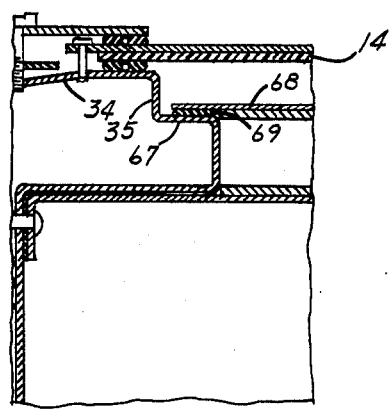
FIG. 8 is a perspective view of an alternative form of side rail configuration with a double layer cover arrangement.

In a modified form of construction shown in FIG. 8, the side rail 65 is constructed with an additional step section 67 formed in wall section 35 and an inner cover sheet 68 is supported thereon with a suitable seal 69 to form a double layer of closed air space between the external air and the absorbing surface of the collector plate for use in colder climates and the like.

Figure 9:
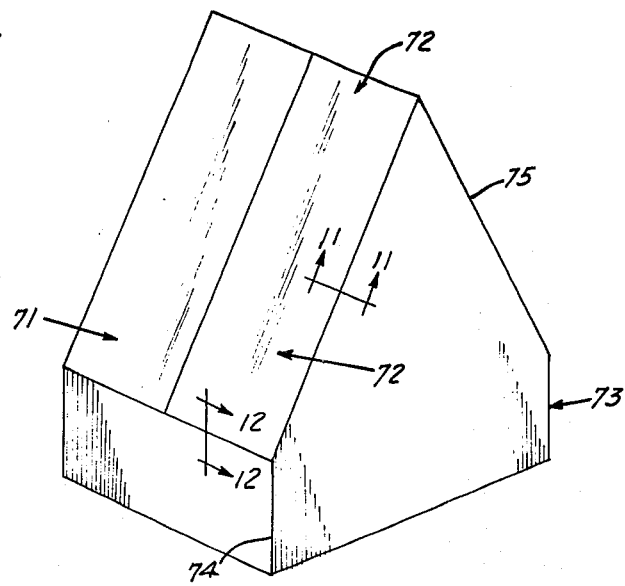
FIG. 9 is a perspective view of a solar hot air heating structure having an array of four solar heat collecting modules arranged as two cells.

A solar heating structure and modular system using an array of the above-described modules is shown in FIGS. 9-12. Referring now to FIG. 9, there are shown two cells 71 and 72 of two modules each, supported and positioned by a support structure generally designated by numeral 73. The support structure 73 includes a box-like base portion 74 and an upper A-portion 75. The upper A-portion is constructed with one side thereof open to receive the modules above described. The support structure is constructed with an inside frame preferably made of wooden beam members that are covered by a suitable siding to form an enclosed inner space. The disposition and incline of the upper A-portion is such that the solar modules face the sun and are tilted so that the inside angle of the absorbing surface to the horizontal is on the order of about 60 degrees.

Figure 11:
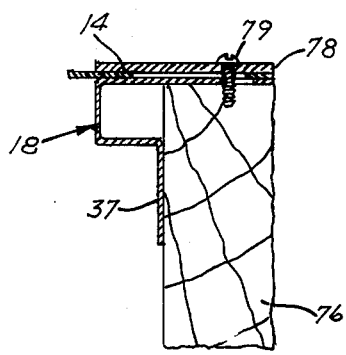
FIG. 11 is a sectional view taken along lines 11—11 of FIG. 9 showing the side portion of one end module supported on and affixed to a beam of a supporting frame.
Figure 12:
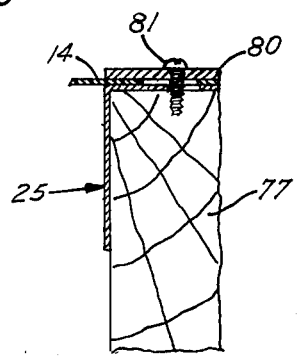
FIG. 12 is a sectional view taken along lines 12—12 of FIG. 9 showing the end portion of the solar heat collecting module supported on and affixed to a beam of a supporting frame.

As best seen in FIGS. 11 and 12, in a structure like that of FIG. 9 the shape of the side rails is such that the top flange section 34 rests on a side beam 76 and the outer sidewall web section 37 butts against the side of the beam 76. The end rail 25 also has a top flange section that rests on the top of a side beam 77 and a flange that butts against the side of the beam 77. Typically, then, the sides and ends of the modules fasten to the beam support structure much like that between modules, using an overlapping metal strip 78 along the joint, wood screws 79 on the side beam, a metal strip 80 along the joint, and wood screws 81, as best seen in FIGS. 11 and 12. These joints again preferably have adhesive material or heat-insulating tape between parts to form water-tight, heat-insulating gas-tight connections.

Figure 10:
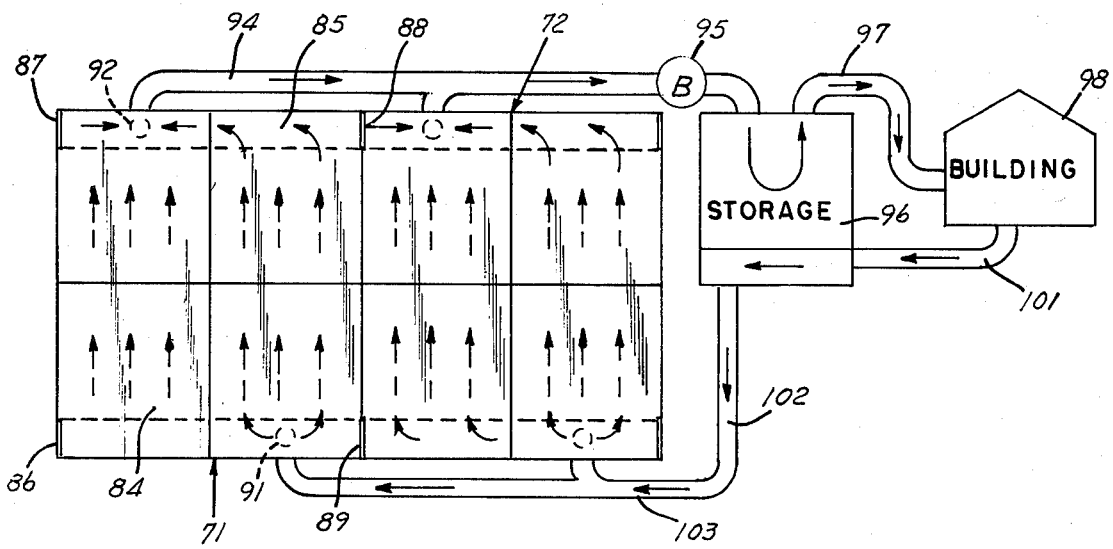
FIG. 10 is a schematic diagram of a heating system for a building associated with the structure shown in FIGS. 1-9.

Referring now to FIG. 10, the first cell illustrated, 71, has two modules 84 and 85 of the construction above described arranged side-by-side with the adjacent manifold sections butting against one another to be flow-coupled. The exterior ends of the manifold of module 84 are closed as with closure boards represented at 86 and 87 and the exterior ends of the manifolds of module 85 are closed as with closure boards represented at 88 and 89. There is an air inlet hole 91 in the bottom of one manifold of module 85 and an air outlet 92 in the bottom of the opposite manifold of module 84. The flow of air then is into hole 91, through the flow passages of modules 84 and 85, and out the air outlet 92, as shown by arrows. The airflow path from inlet to outlet for more than one module connected side-by-side in a cell is seen to be substantially the same distance from inlet to outlet and this results in substantially uniform heating throughout the cell.

The next adjacent cell 92 is of an arrangement identical to cell 71 with the air flowing in the same manner. The heated air flows through an outlet manifold 94 by a blower 95 or the like into a storage tank 96 and in turn is pumped via a flow line 97 into a building 98 such as a house. There is a cool air return line 101 from the house to the cool air return of the storage tank and back to the array of modules by return flow line 101 to an inlet manifold 103.

In the operation of each module the solar radiation passes through the cover sheet 14 and strikes the absorbing surface 19a of the collector plate wherein the solar radiation is converted to heat and heats the collector plate. The heated collector plate in turn heats the air flowing through flow passage 22. The closed air space 21 functions as a heat-insulating member to reduce heat losses by conduction.

The above described module may be made in a selected range of sizes. This module is characterized by being durable, water and weather resistant, heat-insulated and effective in providing heat for hot air heating systems. A module found effective is twelve feet in length and two and one-half feet in width and handles about 60 cfm airflow. Each of the cells typically will be comprised of four or five modules.

Although the present invention has been described with a certain degree of particularity, it is understood that the present disclosure has been made by way of example and that changes in details of structure may be made without departing from the spirit thereof.

What is claimed is:

1. In a solar heat collecting module, the combination comprising:

a generally hollow member having an inner cavity which includes a cover portion for passing solar energy into said inner cavity, a heat-insulating back portion forming an integral structural part of said member, and opposed rigid side rail portions supporting said cover portion and side rail portions in a fixed spaced relation to one another;

a collector plate disposed in said inner cavity having a solar energy absorbing surface with a closed air space formed between said cover portion and said solar energy absorbing surface and a flow passage along the back face of said collector plate and defined in part by said back portion, said collector plate absorbing the solar energy transmitted through said top portion to become heated and in turn heat a stream of air flowing through said flow passage; and heat-washing means for said collector plate extending into said flow passage from the back face of said collector plate, said heat-washing means including at least one projection arranged generally transverse to the direction of air flow, said projection having a pair of oppositely disposed tapered side edges that converge toward an apex around which the air passes causing a turbulence in the air flowing through said flow passage to enhance the removal of heat from said collector plate into said stream of air.

2. In a solar heat collecting module, the combination comprising:

a generally hollow member having an inner cavity which includes a cover portion for passing solar energy into said inner cavity, a heat-insulating back portion forming an integral structural part of said member, and opposed rigid side rail portions supporting said cover portion and side rail portions in a fixed spaced relation to one another;

a collector plate disposed in said inner cavity having a solar energy absorbing surface with a closed air space formed between said cover portion and said solar energy absorbing surface and a flow passage along the back face of said collector plate and defined in part by said back portion, said collector plate absorbing the solar energy transmitted through said top portion to become heated and in turn heat a stream of air flowing through said flow passage; and a support strap at an intermediate position between the ends of said collector plate and connected at the ends of said strap to said side rails to also support said collector plate above said back portion, said support strap having at least one bent intermediate section projecting into the flow passage extending in a generally transverse direction to the air flow including a pair of oppositely disposed tapered side edges around which the air flows for causing turbulence in the stream of air to wash heat from the heated collector plate into said stream of air.

3. In a solar heat collecting module as set forth in claim 2 wherein said support strap has opposed edges bent toward one another to form a pair of spaced projections extending only a limited length of said support strap.

4. In a solar heat collecting module, the combination comprising:

(a) a cover sheet for passing solar energy in one direction and inhibiting the passage of infrared energy in the opposite direction;

(b) a thermally insulated back sheet;

(c) a pair of rigid side rails connected along and sealed to close the opposite side edges of and supporting said cover and back sheets in a spaced parallel relation to one another;

(d) an imperforate solar energy collector plate between and in spaced relation to each of said cover and back sheets for converting the solar energy to heat in said collector plate, (e) said cover sheet, back sheet and side rails forming an inner cavity, a closed air space between said cover sheet and collector plate to reduce heat loss and an airflow passage along the back face of said collector plate and defined in part by said back sheet;

(f) a support strap at an intermediate position between the ends of said collector plate having a bent intermediate section projecting into the flow passage defining heat-washing means in said flow passage for causing turbulence in the stream of air to wash heat from the heated collector plate into said stream of air;

(g) a manifold portion at each end of said collector plate defining a pair of flow paths along the ends and opening into the flow passage whereby to pass a stream of air along the ends of the collector plate and to and from said flow passage; and (h) end rails secured to each manifold portion and providing a support surface at the ends of said cover and back sheets.

5. In a solar heat collecting modular hot air heating system, the combination comprising:

(a) a plurality of solar heat collecting modules arranged side-by-side and supported on a support structure which includes an open framework that inclines the modules to the horizontal, each said solar heat collecting module having (b) an outer sheet that transmits solar energy in one direction and inhibits the passage of infrared energy in the opposite direction;

(c) a thermally insulated back sheet;

(d) a pair of rigid side rail members arranged in spaced parallel relation and connected along the opposite side edges for supporting said inner and outer sheets in spaced parallel relation to one another, adjacent side rails having front flange sections that overlap and are connected together at a weather-resistant seal;

(e) a heat-conductive collector plate having a solar energy absorbing surface for converting solar energy absorbed by said surface to heat in said plate that is in turn transmitted to heat air flowing in a flow passage between the collector plate and said back sheet, said collector plate being disposed between and in spaced relation to each of said outer and inner sheets supported along the opposite side edges by said side rails whereby to form a closed air space between said cover sheet and said collector plate;

(f) manifold means defining first flow paths along the ends of the collector plate and second flow paths into each end of said flow passage whereby to pass said heated air to and from said flow passage for each module, the manifold means of each adjacent module being in flow communication with one another via said first flow paths to pass heated air from one module through the manifold of the next adjacent module, the modules at the ends having the first flow paths closed off to direct the air flow through a common inlet at one end of the array and a common outlet at the other end of the array arranged so that incoming air being heated travels approximately the same distance through a plurality of the modules from said inlet to said outlet;

(g) heat-washing means in the flow passage associated with the back face of the collector plate that projects into the flow passage from the collector plate said heat-washing means including at least one projection arranged generally transverse to the direction of air flow, said projection having a pair of oppositely disposed tapered side edges that converge toward an apex around which the air passes to cause turbulence in the airflow to wash heat from the collector plate into an air stream in the flow passage;

(h) end rails secured to each manifold means and providing a support surface at the ends of said inner and outer sheets; and (i) means for moving a stream of air through said plurality of modules from said inlet to said outlet.

* * * * *